United States Patent [19]

Moreton

[11] 4,035,777

[45] July 12, 1977

[54] DATA PROCESSING SYSTEM INCLUDING PARALLEL BUS TRANSFER CONTROL PORT

[76] Inventor: Derek Vidion Moreton, 15 Church Road, Alsager, Cheshire, England

[21] Appl. No.: 532,057

[22] Filed: Dec. 12, 1974

[30] Foreign Application Priority Data

Dec. 14, 1973   United Kingdom ............ 59311/73

[51] Int. Cl.² .................. G06F 13/00; G06F 15/16
[52] U.S. Cl. ............................................. 364/200
[58] Field of Search ..................... 340/172.5; 445/1

[56] References Cited

U.S. PATENT DOCUMENTS

| | | | |
|---|---|---|---|
| 3,094,610 | 6/1963 | Humphrey, Jr. et al. ...... | 340/172.5 |
| 3,242,467 | 3/1966 | Lamy ................. | 340/172.5 |
| 3,274,561 | 9/1966 | Hallman et al. ............ | 340/172.5 |
| 3,312,951 | 4/1967 | Hertz ................. | 340/172.5 |
| 3,386,082 | 5/1968 | Stafford et al. .......... | 340/172.5 |
| 3,416,139 | 12/1968 | Marx ................. | 340/172.5 |
| 3,480,914 | 11/1969 | Schlaeppl ............ | 340/172.5 |
| 3,544,973 | 12/1970 | Borck et al. .......... | 340/172.5 |
| 3,710,351 | 1/1973 | Nakamura ............ | 340/172.5 |
| 3,813,651 | 5/1974 | Yamada ............... | 340/172.5 |
| 3,813,651 | 5/1974 | Yamada ............... | 340/172.5 |

*Primary Examiner*—Mark E. Nusbaum
*Attorney, Agent, or Firm*—George R. Douglas, Jr.; Sherman Levy; Anthony D. Cennamo

[57] ABSTRACT

A multiprocessor data processing system comprises a plurality of processing modules interconnected by a mains data highway. Each module contains an internal highway connected to main highway by means of a port unit, which monitors activity on the internal highway and reproduces on to the main highway any addresses which do not evoke any response on the internal highway. The invention has particular application for constructing flexible systems from large-scale integrated circuit (LSI) technology.

4 Claims, 2 Drawing Figures

DATA PROCESSING SYSTEM INCLUDING PARALLEL BUS TRANSFER CONTROL PORT

BACKGROUND OF THE INVENTION

This invention relates to multiprocessor data processing systems and is particularly, although not exclusively, concerned with systems utilising large scale integrated circuit (LSI) techniques in their construction.

Multiprocessor systems are known, which comprise a plurality of processing units sharing a common memory. However, the fabrication of such systems in LSI form presents considerable difficulties since the number of terminals which can conveniently be provided on an LSI chip for interconnection with other chips is limited. Thus, it has been necessary in the past to use a number of medium-scale or small scale integrated circuit chips in conjunction with each LSI chip to provide the necessary interconnections. Moreover, known systems tend to be difficult to modify to meet changing user requirements.

One object of the present invention is to provide a multiprocessor data processing system which is organised in a novel manner such as to facilitate modification of the system.

SUMMARY OF THE INVENTION

According to a first aspect of the invention a multiprocessor data processing system comprises: a main highway for carrying addresses and date; a plurality of addressable functional units connected to the main highway; and a plurality of processing modules each of which comprises an internal highway for carrying addresses and data, a processing unit connected to the internal highway and arranged to apply addresses and data thereto, at least one further addressable functional unit connected to the internal highway, and a port unit connected between the internal highway and the main highway for reproducing, from the internal highway on to the main highway, those addresses which do not correspond to any of the functional units connected to the internal highway.

It will be seen that the invention provides a multi-level highway system which permits each processing module to function completely independently of the other processing modules, thus enabling a number of different data processing jobs to be performed in parallel. Each processing module can, however, gain access to the main highway, when required, by way of its corresponding port unit. As far as the processing units within the processing modules are concerned, there is no distinction between the addresses on the main and internal highways: the address system appears continuous to these processing units. Moreover, the system can readily be modified, by adding further processing modules or functional units to, or removing them from, the main and internal highways.

Conveniently, each of said units is embodied in one or more LSI chips, each of which interfaces on to one of said highways. It will be seen that, since each chip only has to interface on to the highway system, the number of terminals required on each chip is limited.

Preferably, said highways are all electrically identical, so that any chip designed to interface on to one of the highways can also interface on to any of the other highways. This permits the design of a standard range of LSI chips which can be assembled in a large number of different configurations according to requirements.

Preferably, each functional unit is arranged to produce a response signal when it detects its own address on the highway to which it is connected. In this case, each port unit is preferably arranged to store each address applied to the internal highway to which it is connected, and to apply the stored address to the main highway if no response signal is detected within a predetermined time period. Thus, the port unit does not have to be provided with any information about which addresses are on the main highway and which are on the internal highway, but instead operates on the assumption that all addresses which do not produce any response on the internal highway must correspond to the main highway. This feature contributes greatly to the flexibility of the system, since it enables units to be added or removed without the necessity for any modification of the port unit.

In a preferred form of the invention, each said processing module further includes a queue store connected to the internal highway of that module and also to the main highway and addressable over either of those highways. The processing modules may then be so programmed that, when one processing module generates information for transmission to another of the processing modules, the former module places the information in a memory unit connected to the main highway, and places a pointer specifying the address of that information in the queue store of the latter module, and when a module requires to receive information from another module, it removes the first pointer from its own queue store, and addresses the corresponding information in said memory unit. Conveniently, in each said processing module, the port unit and the queue store may be embodied as a single LSI chip.

In particular embodiment of the invention, the functional units connected to the main highway contain a plurality of blocks of storage space, and a storage allocation list for containing a plurality of pointers respectively identifying said blocks, each said processing module being so programmed that, when it requires to utilise a further block of storage space, it removes one of said pointers from said list, and when it determined that it no longer requires to utilise a particular block of storage space, it inserts a pointer representing that block into said list.

Preferably, said list is a queue store.

The invention also includes a port unit, suitable for use in a system according to the first aspect of the invention.

BRIEF DESCRIPTION OF THE DRAWINGS

One multiprocessor data processing system in accordance with the invention will now be described, by way of example, with reference to the accompanying drawings, of which.

DESCRIPTION OF THE PREFERRED EMBODIMENT

Figure 1:
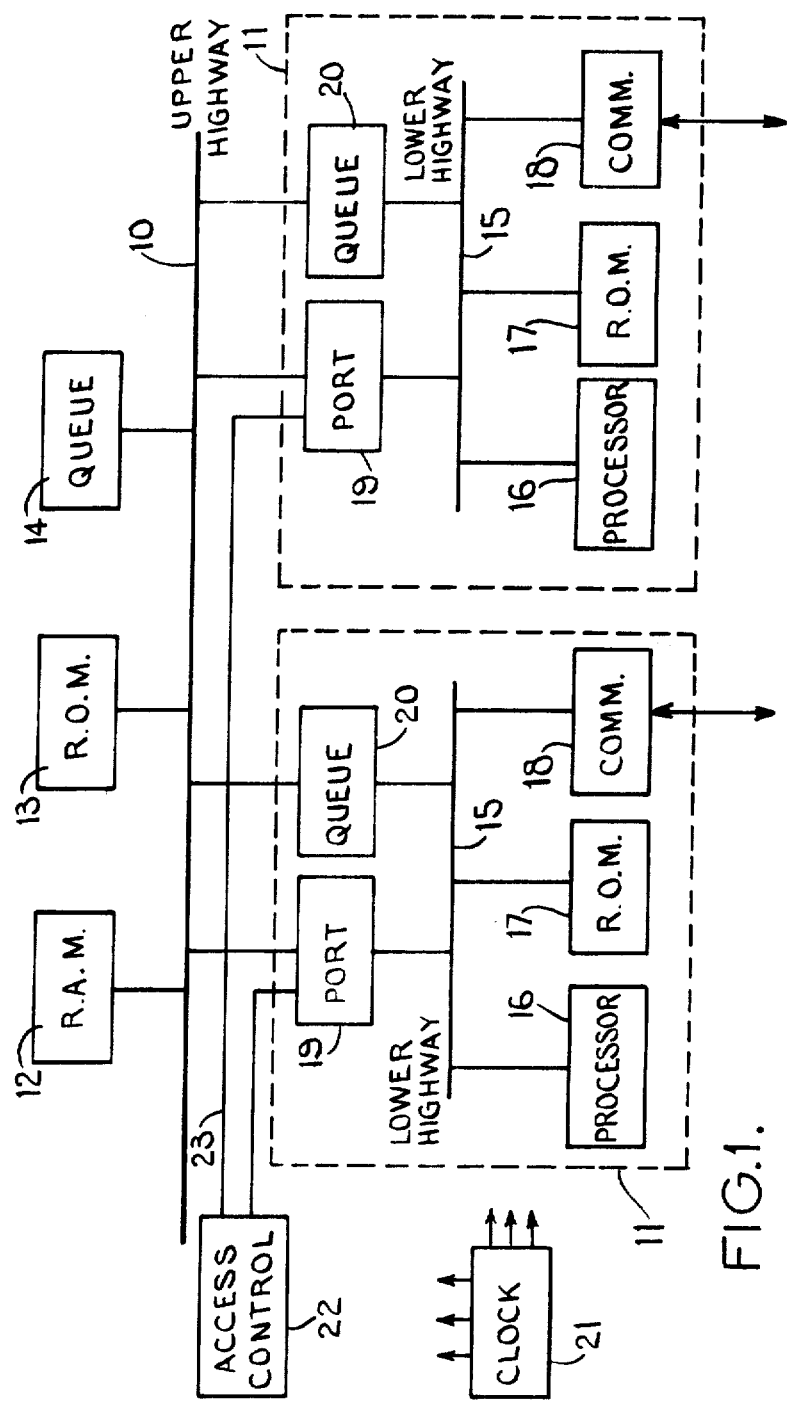
FIG. 1 is a schematic block diagram of the system.

Referring to FIG. 1, the system includes a main highway 10, referred to hereinafter as the upper highway, to which are connected a plurality of processing modules 11, and a plurality of units forming a common area of storage for the processing modules. These units comprise a plurality (only one shown) of random access memory (RAM) units 12, for providing working memory space, a plurality (only one shown) of read-only memory (ROM) units 13, for storing fixed programs and data, and at least one queue store unit 14, the purpose of which will be described below. Each of the units 12, 13, 14 is formed as a single LSI chip.

Each of the processing modules 11 includes a separate internal highway 15, referred to as the lower highway, to which are connected a processing unit 16 and one or more further functional units 17, 18. In this particular example, the further units comprise an ROM unit 17, for storing fixed programs and data for the processing module, and a communication unit 18, which permits the processing unit to communicate with peripheral devices (not shown) such as visual display units, or modulation/demodulation units for communication with a remote system over a transmission line. Each module 11 also contains a port unit 19, which interconnects the lower highway 15 within that module to the upper highway 10. The processing module also contains a queue store 20 connected between the upper highway 10 and the lower highway 15, the function of which will be described later.

Each of the units 16, 17, 18 is formed as a separate LSI chip, while the units 19 and 20 are conveniently formed together as a single LSI chip.

The system also includes a clock unit 21 which supplies a succession of clock pulses to each of the units of the system so as to synchronise the operation of these units. The frequency of the clock pulses is conveniently chosen to be the maximum consistent with the chip technology. An access control circuit 22 is also provided, the circuit 22 being connected to each port unit 19 by way of a separate wire 23, referred to as the "Request/Go" wire.

The construction of the units 12, 13, 14, 16, 17, 18, 20, 21, 22 will not be described in detail, since such units are all well known in the art, and the details of their construction are not essential to the present invention. However, the structure and operation of the port unit 19 will be described in detail below.

The upper highway 10 and lower highways 15 are all electrically identical with each other, so that any chip which is designed to interface on to a lower highway can also be connected to the upper highway, and vice versa. For example, the ROM chip 13 may be identical in design to the ROM chip 17. This permits a standard range of chips to be designed, which can be connected together in a large number of different configurations, as required, and also facilitates modification of the system to meet changing requirements. Each of the highways 10, 15 consists of 10 wires, each of which has two electrical states representing the binary digits 0 and 1 respectively. Eight of these wires, referred to as data-/address wires D0, D1 . . . D7, are used to carry data, addresses and other signals, while the other two, referred to as control wires C0 and C1, are used to carry the following four codes:

C0 = 0, C1 = 0 : Null
C0 = 0, C1 = 1 : First address byte
C0 = 1, C1 = 0 : Ready
C0 = 1, C1 = 1 : Exception.

The significance of these four codes will become apparent from the following description.

In operation of the system data transfers over the lower highways are initiated by processing units 16, which are therefore referred to as active units. The various memory units 12, 13, 14, 17 and 20 and the communication units 18 cannot initiate data transfers, but merely act in response to signals on the highways, and are therefore referred to as passive units. As will be explained, the port units 19 cannot initiate transfers on the lower highways, and are therefore passive units when viewed from the lower highways, but can initiate transfers on the upper highway and are therefore active units as far as this highway is concerned.

Data transfers over any highway are thus initiated by an active unit by application of suitable signals to that highway. The particular passive unit, and the particular location within that unit, into or from which data is to be transferred are identified by means of a fourteen-bit address. Since there are only eight wires D0–D7 on each highway for transmitting addresses, the address must be transmitted as two bytes in two successive clock periods. In the first clock period, the six most significant bits of the address are applied to wires D2–D7, the remaining two wires D0 and D1 being used for the transmission of two qualifier bits Q0 and Q1 which convey the following information:

Q0 = 0, Q1 = 0 represents "read" (i.e. transfer of data from the passive to the active unit);
Q0 = 0, Q1 = 1 represents "write" (i.e. transfer from the active to the passive unit);
Q0 = 1, Q1 = 0 represents "First byte of instruction." This is not used in normal operation of the system, but is useful in testing the system and debugging of programs.

The sequence of events in a read cycle between an active unit and a passive unit connected to the same highway is as follows:

a. The active unit places the six most significant address bits on wires D2–D7, the read qualifier Q0 = 0, Q1 = 0 on the wires D0, D1, and the "first address byte" code C0 = 0, C1 = 1 on the control wires. The signals D0–D7 are stored by all the passive units on that highway.

b. In the next clock period, the active unit places the second address byte on wires D0–D7 and the "null" code C0 = 0, C1 = 0 on the control wires. The signals on D0–D7 are again stored by all the passive units. Each of the passive units (other than the port unit) then examines the fourteen-bit address which it now has stored to determine whether this address corresponds to the, or one of the, addresses allocated to that passive unit.

c. In the next clock period, the passive unit identified by the address places the required data on the wires D0–D7 and places the "ready" code C0 = 1, C1 = 0 on the control wires. When the active unit senses the ready code, it reads the data from the wires D0–D7, thus completing the read cycle.

The sequence for writing data from the active to the passive unit is the same in the first two clock periods, except that the write qualifier Q0 = 0, Q1 = 1 is used in the first period. In the third period, the active unit places the data on the wires D0–D7, and holds it there until it detects a ready code C0 = 1, C1 = 0 on the control wires from the identified passive unit, indicating that the passive unit has accepted the data.

If for any reason a passive unit cannot carry out the required transfer (such as might happen if the active unit attempts to write into a full queue store), the passive unit signals to the active unit by means of the exception code C0 = 1, C1 = 1 on the control wires, this exception code being held on for two clock periods. On detecting the exception code, all units on the highway must terminate any current action so as to leave the wires D0–D7 clear for an exception qualifier which is placed on the wires D0–D7 by the passive unit during the second of these clock periods. This qualifier specifies the nature of the exception and allows the active unit to determine what action is to be taken next.

The operation of the port units 19 will now be described.

As mentioned above, the system uses a fourteen-bit address, so that there are $2^{14}$ (i.e. 16,384) possible different addresses. Some of these addresses are allocated to the passive units 17, 18 connected to the lower highways, while others will be allocated to the units 12, 13, 14 connected to the upper highway. Each of the processor units 16 may require to transfer data to or from any one of the passive units either on its own lower highway 15, or on the upper highway 10. In either case, the processor unit proceeds as described above, applying the required address in two successive clock periods to the lower highway 15. If the address corresponds to a unit on the lower highway, that unit will produce a ready signal and the transfer will be completed as described above. However, if the address corresponds to a unit on the upper highway, no ready signal will be produced.

The port unit 19 monitors the read/write cycles on the lower highway, and if it does not detect a ready signal within a predetermined time period (in this case, four clock periods) after the appearance of the first address byte, takes the following action. First, the port unit reproduces the address, control codes and data (if any) on the upper highway in exactly the same way as they were produced on the lower highway. The required passive unit on the upper highway will then respond to these signals as described above. Any signals received by the port unit over the upper highway will be reproduced by the port unit on the lower highway, and thereby returned to the initiating processing unit 16. This will be described in greater detail below.

Thus, it will be seen that the port unit 19 establishes communication between the upper and lower highways as and when required. As far as the processing units 16 on the lower highways are concerned, there is no distinction between units on the upper and lower highways: both are addressed in exactly the same way. Moreover, the system can readily be modified, e.g. by adding further RAM units to the upper highway 10, without any modification of the port units. Further, it will be appreciated that each of the processing modules 11 may operate independently of all the others, thus permitting a degree of parallel processing; only when the processing units 16 require to access units on the upper highway 10 is there any interaction between the processing modules.

The access control circuit 22 is provided in order to ensure that only one of the port units 19 (which are active units as far as the upper highway is concerned) can access the upper highway at a time, thus avoiding any conflict between the port units. If a port unit requires to initiate a read/write cycle, it places a binary 1 (signifying a request) on its associated "Request and Go" line 23, for one clock period. The access control circuit 22 monitors these requests from all the port units, and returns a Go signal to the requesting unit by raising its Request and Go line 23 for one clock period. The circuit 22 is so arranged that it cannot produce a further Go signal until the first requesting port unit has had time to complete its read/write cycle.

The logic circuitry of one of the port units 19 will now be described in detail with reference to FIG. 2, in which the data/address wires of the lower highway are labelled LD0–LD7, those of the upper highway are labelled UD0–UD7, the control wires of the lower highway are labelled LC0, LC1, and those of the upper highway UC0, UC1.

Figure 2:
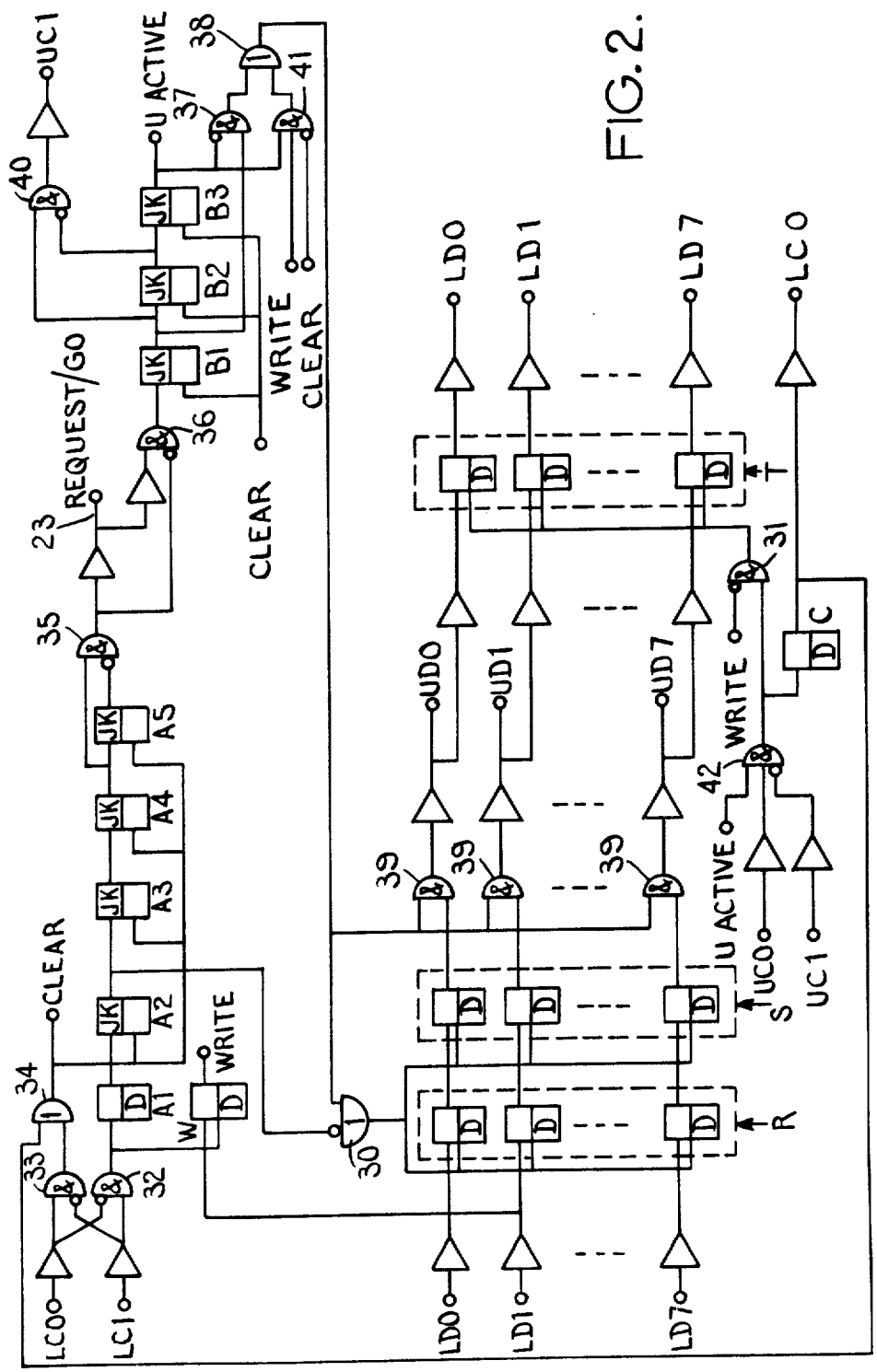
FIG. 2 is a logic diagram of the port unit of the system.

Referring to FIG. 2, the port unit includes two eight-bit registers R and S which are used for storing the two address bytes so that they can be reproduced on the upper highway if necessary, and a third eight-bit register T, which is used for storing data while transferring it from the upper to the lower highway. Each of these registers R, S, T comprises eight D-type bistable circuits, as shown in the Figure. The port unit also includes a timing chain consisting of a D-type bistable A1 and four JK-type bistables, A2–A5, which is used to control the entry of the address bytes into the R and S registers, and also to time the duration between the appearance of the address and the ready signal on the lower highway. A further timing chain, comprising three JK-type bistables B1, B2 and B3, is also provided, for controlling the sequence of operation of the port unit after access has been gained to the upper highway. The port unit also includes two further D-type bistables W and C, the purpose of which will become apparent.

Each of these bistables has a clock input (not shown) to which are applied clock pulses from the clock 21 (FIG. 1), so that each bistable can only change state on occurrence of a clock pulse. A D-type bistable, when set, will revert to its reset state at the next clock pulse applied to it, whereas a JK-type bistable will revert to its reset state only if a 1 is applied to its reset input. Initially, it is assumed that all the JK bistables are reset. The clock pulses are gated to the bistables of the R and S registers by means of a binary 1 output from an OR gate 30 when that gate is enabled. Similarly, the clock pulses are gated to the bistables of the T register by a binary 1 output from an AND gate 31 when that gate is enabled.

When an active processing unit 16 (FIG. 1) on the lower highway requires to write data into a passive unit on the upper highway, the following sequence of events takes place:

a. The active unit applies the six most significant address bits to wires LD2–LD7, the qualifier bits 0, 1 to the wires LD0, LD1 (signifying write), and the first address byte code LC0 = 0, LC1 = 1 to the code wires. Because bistable A2 is reset, its output is 0, this being applied to an inverting input of the OR gate 30. Thus, OR gate 30 is enabled, and the first address byte on wires LD0–LD7 will therefore be clocked into the register R. The first address byte code on LC0 and LC1 enables an AND gate 32, which triggers the first bistable A1 of the timing chain A1–A5 into its set state. The enablement of the AND gate 32 also causes the bistable W to be clocked, permitting it to be triggered into its set state by the 1 on LD1. The bistable W thus stores the information that this is a write operation, this being signified by the output of the bistable, WRITE = 1.

b. At the next clock period, the processor unit applied the second address byte to the wires LD0–LD7, the code wires now being in the null condition LC0 = 0, LC1 = 0. Since A2 is still reset, the OR gate 30 is still enabled, and therefore the first address byte is clocked from register R into register S, and the second address byte clocked into register R. Bistable A2 is now set by the output of A1.

c. At the next clock period, the processor unit applies a data byte to the wires LD0–LD7. If the addressed passive unit is on the lower highway, that passive unit will respond with the ready code LC0 = 1, LC1 = 0 on the control wires to signify that it has accepted the data. The ready code is detected by an AND gate 33, which in turn enables an OR gate 34, thus producing a signal CLEAR = 1 which is applied to the reset inputs of all the JK bistables in the port unit, so as to reset the unit to its initial state. However, if no ready code appears, the operation of the timing chain continues, A3 now becoming set. Since A2 is now set, no further clocking of the R and S registers occurs.

d. If a ready code appears at the next clock pulse, the signal CLEAR = 1 is produced and the port unit reverts to its initial state. However, if no ready signal appears, the bistable A4 is set by the output of bistable A3. Setting of A4 indicates that no ready signal has appeared within four clock periods of the initial appearance of the first address byte, and is taken to signify that the address in question must relate to the upper highway instead of the lower highway. The output of A4 enables an AND gate 35, which in turn produces a 1 on the Request/Go line 23, representing a request by the port unit to be allowed access to the upper highway.

e. At the next clock period, bistable A5 becomes set, thus disabling the gate 35 and removing the request on line 23.

f. No further action takes place, until a Go signal is received on the Request/Go line 23 from the access control circuit 22, indicating that the port unit may now access the upper highway. The Go signal enables an AND gate 36, which in turn sets the first bistable B1 of the second timing chain B1, B2, B3. Setting of bistable B1 causes an AND gate 37 to be enabled, which in turn enables an OR gate 38. The output from gate 38 enables a set of AND gates 39, thus gating the contents of the register S (i.e. the first address byte) on to the wires UD0–UD7 of the upper highway. The output from gate 38 also enables the OR gate 30 again, thus causing the contents of register R (i.e. the second degree byte) to be clocked into register S, and causing the data byte (which is still held on the wires LD0–LD7 by the processor unit) to be clocked into the register R. The setting of bistable B1 also enables an AND gate 40, causing a 1 to be applied to the control wire UC1, thus producing the first address byte code UC0 = 0, UC1 = 1 on the upper highway.

g. At the next clock period, bistable B2 becomes set, disabling the AND gate 40 and causing the control wires on the upper highway to revert to the null code UC0 = 0, UC1 = 0. Since bistable B1 is still set, gates 37, 38, 39 and 30 are still enabled, so that the contents of register S (i.e. the second address byte) are now gated on to the upper highway, and the contents of the register R (i.e. the data byte) are clocked into register S. In addition, the same data will again be clocked into R from the wires LD0–LD7.

h. At the next clock period, bistable B3 becomes set, causing gate 37 to be inhibited. However, gate 38 is still enabled, by another AND gate 41, which is now enabled by means of the output of B3, the WRITE signal from bistable W, and the absence of the CLEAR signal. hence, gates 39 and 30 are still enabled, with a result that the data word in register S will be gated on to the upper highway wires UD0–UD7, the contents of R will be clocked into S, and the same data word will again be clocked into R from the wires LD0–LD7.

i. This process continues, the same data word being gated out of register S each clock period, until eventually the ready code UC0 = 1, UC1 = 0 is received from the passive unit over the upper highway, signifying that the passive unit has accepted the data. The ready code, in conjunction with the output from the bistable B3 (labelled U ACTIVE), causes an AND gate 42 to become enabled, thus setting the bistable C. The output from this bistable C is applied to the wire LC0, thus reproducing the ready code LC0 = 1, LC1 = 0 on the lower highway. This ready code will be detected by the processing unit which will then remove the data word from the wires LC0–LD7. The output of bistable C is also applied to the OR gate 34, thus producing the CLEAR signal which resets all the JK bistables, so as to place the port unit back in its initial state once more.

The sequence of events when the processing unit requires to read data from a passive unit on the upper highway is similar to the write sequence, but with the following differences:

A. At stage (a), the qualifier bits applied to LD0, LD1 are 0,0, signifying read. Hence, the bistable W is not set (or is reset if already set), and the output WRITE = 0.

B. At stage (c), no data is applied to the wires LD0–LD7.

C. At stages (f) and (g) no data is clocked into register R.

D. At stage (h), gate 41 is not enabled, since WRITE = 0. Hence, nothing further is gated out of the register S on to the upper highway.

E. At stage (i), nothing happens until the ready code UC0 = 1, UC1 = 0 is received over the upper highway, signifying that the passive unit has placed the requested data byte on the wires UD0–UD7. The bistable C is now set, reproducing the ready code on the lower highway and producing the CLEAR signal. Additionally, AND gate 31 is enabled (since the inhibiting WRITE input is now not present), causing the data byte on wires UD0–UD7 to be clocked into register T, and thus to be applied to the lower highway wires LD0–LD7 for transmission to the active processor unit.

The port unit 19 may also contain further circuitry (not shown) to handle exception codes appearing on either the upper or lower highways. With this feature circuitry, if the port unit received an exception code UC0 = 1, UC1 = 1 on the upper highway while carrying out a read/write cycle as described above, it will reproduce this code and its associated qualifier on the lower highway. If the port unit receives an exception code from the upper highway at any other time, it will reproduce this on the lower highway only if the accompanying exception qualifier has D0 = 0. Similarly, if the port unit receives an exception code LC0 = 1, LC1 = 1 on the lower highway at any time, it will reproduce this on the upper highway only if its qualifier has D1 = 0. Thus, an exception code will be propagated throughout the entire system if its qualifier has both D0 and D1 = 0.

This completes the description of the port unit.

Referring once more to FIG. 1, the purpose of the queue stores 20 will now be described.

As already mentioned, each of these stores is connected to a lower highway 15 and to the upper highway 10, and can be written into, or read, from either highway. Each of these queue stores can contain a list of pointers, each of which represents the address of a block of storage space in one of the RAM units 12 on the upper highway.

When one of the processor modules 11 requires to communicate with another such module, either to transfer data to it, or to provide it with instructions, it writes the message into an available block of storage space in a RAM unit 12, and at the same time writes a pointer, representing the address of this block, into the queue store 20 of the module to which it requires to pass the message. Correspondingly, whenever a processing module as completed its current job, and requires another job, it addresses its own queue store 20 and examines the first pointer in the queue. The corresponding block of storage space can then be addressed, so as to obtain the message which has been left there by another processing module.

Thus, it will be seen that the queue stores 20 provide a simple but effective means for interprocessor communication.

The address of a given queue store 20 as viewed from the upper highway 10 need not necessarily be the same as its address when viewed from the lower highway 15. In fact, it is convenient to construct the stores 20 so that their addresses when viewed from their respective lower highways 15 are all identical, although, of course, their addresses when viewed from the upper highway must all be different. This means that the necessary program for handling its queue store can be the same for each processing module, with a resultant saving in programming effort.

The advantage of arranging for the queue stores 20 to be accessible from either the upper or lower highways is that it permits a processor unit 16 to access its own queue store, without having to access the upper highway. This is particularly important when a queue becomes empty, in which case the corresponding processor unit 16 will be repeatedly accessing its queue store, looking for further pointers.

If a processing module attempts to write into a queue store which is already full, that queue store must produce an exception code.

Referring still to FIG. 1, the purpose of the queue store 14 will now be described.

As already mentioned, the RAM units 12 on the upper highway constitute a common storage area for all the processing modules 11. This storage area is conveniently divided into blocks of fixed size, each of which will be allocated a certain address. Initially, when none of the common storage is in use, the queue store 14 contains a list of pointers, one for each of the blocks, representing the addresses of those blocks.

Whenever a processing module 11 decides that a new block of common storage is required (e.g. to contain a message for passing to another processing module as described above), it addresses the queue store 14, and removes the first pointer from the queue. The processing module will then utilise this block.

Correspondingly, whenever a processing module decides that an existing block of storage is not longer required (e.g. when it has dealt with a message from another module), it replaces the pointer for that block at the end of the queue store 14. In this way, storage space is only allocated when it is actually required by a processor.

It should be noted that the length of the queues in queue stores 14 and 20 provide a very good indication of the degree of loading of the system, and preferably means are provided whereby the lengths of these queues may be determined by the processing modules and/or displayed for engineers to assess the performance of the system in use.

I claim:

1. A data processing system comprising addressable storage units connected to each of first and second highways including control signal lines and address and data lines with each said unit capable of providing an address accepted response signal on the highway to which it is connected to indicate that the unit has responded to its address, wherein the improvement comprises a Port Unit comprising:
    a. an address and data communication path connectable between the first and second highways
    b. a storage means in said path for temporarily storing address and data information applied to the address and data lines of the first highway;
    c. gate means normally interupting transfer of the content of the storage means to the second highway;
    d. a first control circuit for controlling the operational state of the gate means, the circuit being so responsive to said address accepted response signals that if a said response signal is not received within a predetermined time interval from the application of the address to the first highway the control circuit causes the gate means to open the data communication path, to allow transfer of the content of the storage means to the addressed unit connected to the second highway; and
    e. a second control circuit for decoding signals applied to the first highway control lines, and for producing an output which is applied to the first control circuit to initiate the operation thereof.

2. A system as claimed in claim 1, and in which the first control circuit includes a timing circuit having
    1. a first section with an input connected to receive the control output of the stored second control circuit, a first output for controlling entry of addresses and data into the storage means, and a second output providing a control signal; and
    2. a second section, having an input connected to receive the output from the first section, and an output connected to provide signals for actuating the gate means.

3. A system as claimed in claim 1, and further comprising
    f. a second data communication path connectable between the first and second highways for enabling transfer of data from an addressed unit on the second highway to the first highway: and
    g. a further control circuit responsive to an output signal produced by the first control circuit, for controlling application of the data from the second highway to the first highway.

4. A data processing system comprising first and second highways, including control signal lines and address and data lines; addressable storage units connected to the highways, with each of said units being capable of providing an address accepted response signal indicative that it has responded to its address, wherein the improvement comprises a Port Unit comprising
    A. first and second sets of terminals respectively connectable with the control signal lines of the first and second highways;
    B. third and fourth sets of terminals respectively connectable to the address and data lines of the first and second highways;

C. means for decoding circuit signals applied to the first and second terminal sets;
D. first storage means having its input side connected to the third terminal set and its output side connected to fourth terminal set;
E. normally closed gate means interposed in the connection between the first storage means output side and the fourth terminal set for normally interrupting transfer of the content of the first storage means to the fourth terminal set;
F. a timing circuit responsive to output from the decoding means associated with the first terminal set for producing, firstly a signal enabling signals applied to the third terminal set to enter the first storage means, and secondly, in the absence of receipt a said address accepted response signal within a predetermined time interval from initiation of operation of the timing circuit, a control signal which causes the gate means to open to allow transfer of the content of the first storage means to the fourth terminal set;
G. a fifth terminal set connectable to the first highway address and data lines;
H. a second storage means connected between the fourth and fifth sets of terminals; and
I. a control circuit responsive to a further control signal derived from the timing circuit for controlling transfer of data from the second highway to the first highway by way of the second storage means.

* * * * *